United States Patent
Tsukernik et al.

(10) Patent No.: US 9,485,190 B2
(45) Date of Patent: Nov. 1, 2016

(54) ALLOCATING SHAPING RESOURCES FOR A CLOUD COMPUTING ENVIRONMENT BASED ON TRANSFER SPEEDS ASSOCIATED WITH THE SHAPING RESOURCES

(71) Applicant: Verizon Patent and Licensing Inc., Basking Ridge, NJ (US)

(72) Inventors: Michael A. Tsukernik, Newton, MA (US); Paul M. Curtis, Sudbury, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 254 days.

(21) Appl. No.: 14/206,590

(22) Filed: Mar. 12, 2014

(65) Prior Publication Data

US 2015/0263976 A1 Sep. 17, 2015

(51) Int. Cl.
*G06F 15/173* (2006.01)
*H04L 12/911* (2013.01)
*G06F 9/455* (2006.01)

(52) U.S. Cl.
CPC ........... *H04L 47/70* (2013.01); *G06F 9/45558* (2013.01)

(58) Field of Classification Search
CPC ................... G06F 2009/45595; G06F 9/4558; H04L 47/70
See application file for complete search history.

(56) References Cited

U.S. PATENT DOCUMENTS

| | | | | |
|---|---|---|---|---|
| 6,594,268 B1 * | 7/2003 | Aukia | ..................... | H04L 45/04 370/230 |
| 9,131,408 B1 * | 9/2015 | Falsafi | .................. | H04W 48/18 |
| 2002/0097677 A1 * | 7/2002 | Hoar | ....................... | H04L 47/10 370/230 |
| 2005/0207411 A1 * | 9/2005 | Ota | ..................... | H04L 12/2856 370/389 |
| 2008/0175269 A1 * | 7/2008 | Alvarez | .................. | H04L 45/00 370/468 |
| 2014/0226486 A1 * | 8/2014 | Akiyoshi | ............ | H04L 43/0894 370/235 |
| 2015/0277990 A1 * | 10/2015 | Xiong | ....................... | G06F 9/52 718/106 |
| 2015/0334040 A1 * | 11/2015 | Crowell | .............. | H04L 12/6418 709/226 |

* cited by examiner

*Primary Examiner* — Dhairya A Patel

(57) ABSTRACT

A device stores shaping resource information in a data structure, where the shaping resource information includes identifiers associated with shaping resources of the device, information indicating whether the shaping resources are available, and information indicating transfer speeds associated with the shaping resources. The device defines a group of available shaping resources based on the shaping resource information stored in the data structure, and receives a packet requesting a particular transfer speed associated with transmitting the packet. The device performs a search of the group of available shaping resources based on the particular transfer speed requested by the packet, and identifies, based on the search, a list of one or more available shaping resources with transfer speeds that match the particular transfer speed requested by the packet. The device transmits the packet toward a destination via one of the one or more available shaping resources provided in the list.

20 Claims, 9 Drawing Sheets

FIG. 5B

Table (520):

| Shaping Resource ID | Transfer Speed | Availability |
|---|---|---|
| 1 | 100 Mbps | No |
| 2 | 20 Mbps | Yes |
| 3 | 20 Mbps | Yes |
| 4 | 30 Mbps | Yes |
| 5 | 5 Mbps | No |
| *** | *** | *** |

Group of available shaping resources (530):

| Shaping Resource ID | Transfer Speed |
|---|---|
| 5 | 5 Mbps |
| 15 | 5 Mbps |
| 2 | 20 Mbps |
| 3 | 20 Mbps |
| 4 | 30 Mbps |
| 20 | 30 Mbps |
| 25 | 80 Mbps |
| *** | *** |

500

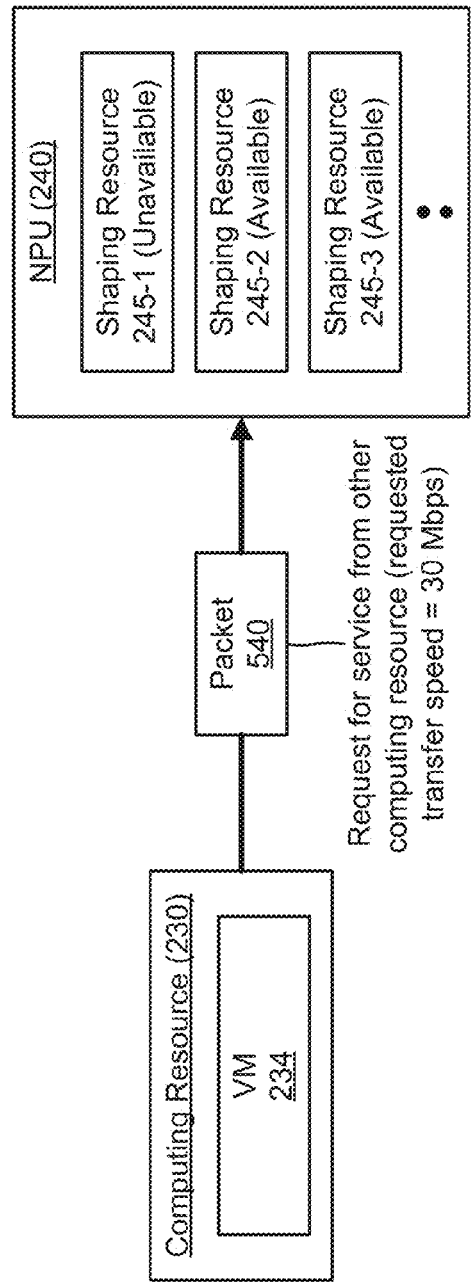

ALLOCATING SHAPING RESOURCES FOR A CLOUD COMPUTING ENVIRONMENT BASED ON TRANSFER SPEEDS ASSOCIATED WITH THE SHAPING RESOURCES

BACKGROUND

Cloud computing is the use of computing resources (e.g., hardware, software, storage, computing power, etc.) which are available from a remote location and accessible over a network, such as the Internet. Cloud computing environments deliver the computing resources as a service rather than as a product, whereby shared computing resources are provided to user devices (e,g., computers, smart phones, etc.). Users may buy these computing resources and use the computing resources on an on-demand basis. Cloud computing environments provide services that do not require end-user knowledge of a physical location and configuration of a system that delivers the services. The computing resources may include virtual machines (VMs) that provide software implementations of a physical machine and execute programs like a physical machine. The VMs may provide cloud computing services to the users.

BRIEF DESCRIPTION OF THE DRAWINGS

FIGS. 5A-5E are diagrams of an example relating to the example process shown in FIG. 4.

DETAILED DESCRIPTION OF PREFERRED EMBODIMENTS

The following detailed description refers to it e accompanying drawings. The same reference numbers in different drawings may identify the same or similar elements.

Cloud computing environments may include network devices, such as network processing t its (NPUs) or network processors, which enable the computing resources to communicate with each other. The NPUs may include shaping resources that provide traffic or packet shaping in order to regulate data transfer (e.g., among the computing resources) with a particular level of performance, quality of service (QoS), etc.

Each of the shaping resources may transfer data (e.g., sequences of network packets) at a particular transfer speed or data transfer (e.g., in megabits per second (Mbps)). When a packet arrives at a NPU, the NPU may associate a shaping resource to the packet that matches a transfer speed requested by the packet. The NPU may learn the transfer speeds of about ten shaping resources per second. However, thousands of packets, with different requested transfer speeds, may be received by the NPU per second. Therefore, the NPU may not be able to properly associate shaping resources to such a volume of packets. Furthermore, for QoS and rate control, packets destined for the same destination, and transmitted in close time proximity, may need to be serviced by the same shaping resource.

Figure 1:
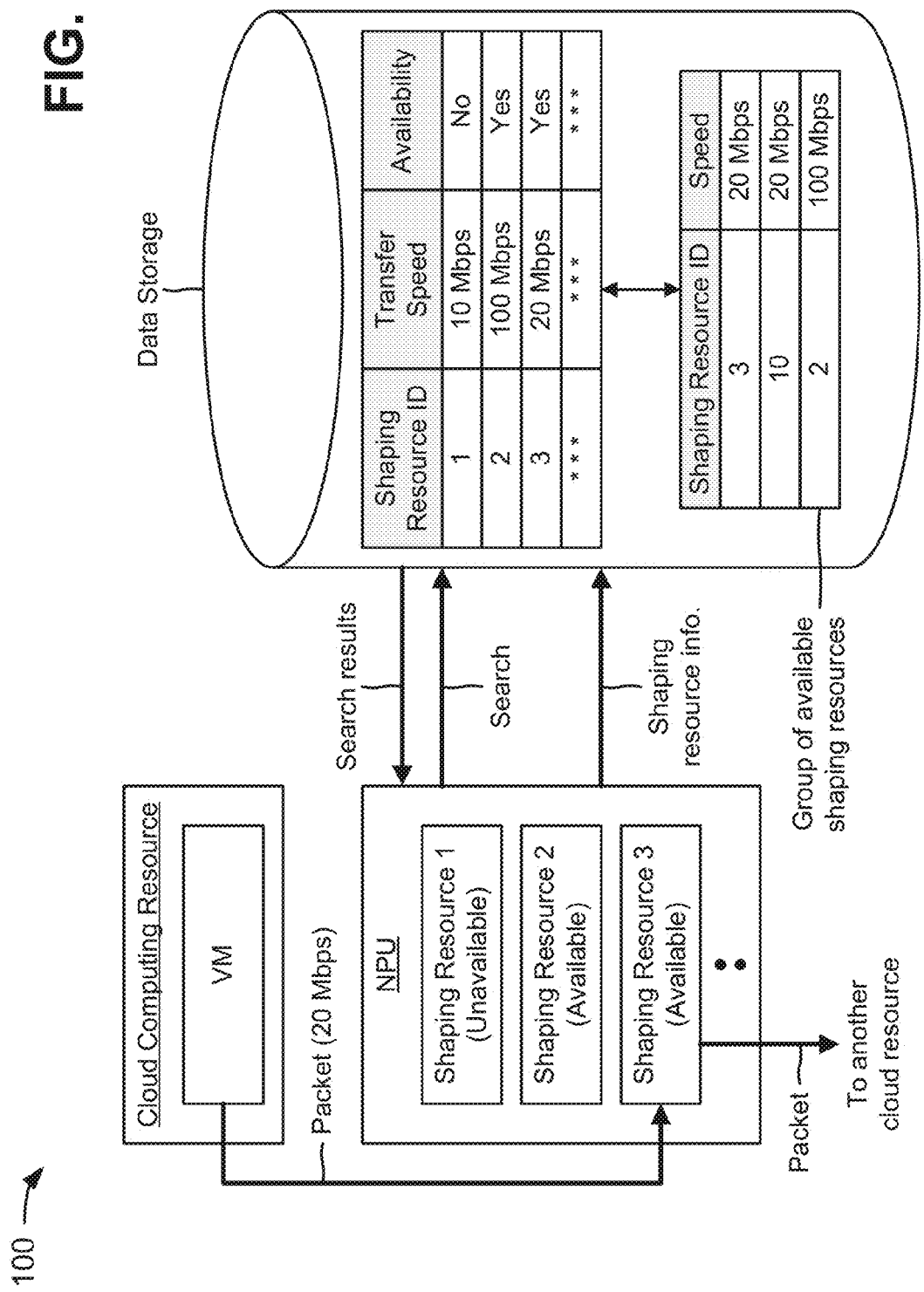
FIG. 1 is a diagram of an overview of an example implementation described herein.

FIG. 1 is a diagram of an overview of an example implementation 100 described herein. In example implementation 100, assume that a cloud computing environment includes multiple cloud computing resources connected by multiple network devices, such as NPUs. As shown FIG. 1, a cloud computing resource may be associated with a NPU and data storage. The cloud computing resource may include a virtual machine (VM) to which a user of the cloud computing environment may provide information (e.g., a packet) and/or may cause to generate a packet.

As further shown in FIG. 1, the NPU may include multiple shaping resources, and may provide shaping resource information to the data storage. The shaping resource information may include identifiers associated with the shaping resources, information associated with transfer speeds of the shaping resources, information associated with availabilities of the shaping resources, etc. The data storage may store the shaping resource information in a data structure (e.g., a table) that includes a shaping resource identifier (ID) field, a transfer speed field, and an availability field. The shaping resource ID field may include identifiers for the shaping resources. The transfer speed field may include information identifying transfer speeds (e.g., data transfer rates) associated with the shaping resources. The availability field may include information indicating whether the shaping resources are available (e.g., not in use) or unavailable (e.g., in use). The NPU may cause the data storage to define a group of available shaping resources based on the shaping resource information stored in the data structure. As shown in FIG. 1, the group of available shaping resources may include a table with a shaping resource ID field and a transfer speed field.

Assume that the user causes the VM of the cloud computing resource to generate a packet that requests a transfer speed of at least 20 Mbps and is destined for another cloud computing resource. As shown in FIG. 1, the VM may provide the packet to the NPU, and the NPU may receive the packet from the VM. The NPU may perform a search of the group of available shaping resources in order to determine a shaping resource to handle transmission of the packet at the particular transfer speed. The NPU may receive search results based on the search of the group of available shaping resources. The search results may include a list of shaping resources (e.g., shaping resources with IDs 3 and 10) that may handle transmission of the packet at the particular transfer speed (e.g., 20 Mbps). The NPU may select one of the shaping resources (e.g., the shaping resource with ID 3) from the list, and may transmit the packet toward the other cloud computing resource via the selected shaping resource.

Systems and/or methods described herein may enable a NPU to quickly associate, to a packet, a shaping resource with a transfer speed that matches a transfer speed requested by the packet. The systems and/or methods may enable the NPU to learn the transfer speeds of available shaping resources at rate that is comparable to a rate at which packets are received by the NPU. In some implementations, the systems and/or methods may enable the NPU to change transfer speeds of shaping resources to match transfer speeds requested by packets. For example, assume that the shaping resources are configured to 10 Mbps and 20 Mbps, and that all of the 10 Mbps shaping resources are unavailable. Further, assume that a new packet requests a 10 Mbps transfer speed, and that the search for a shaping resource occurs approximately 200,000 times per second. In such an example, the NPU may cause a change of the transfer speed of a 20 Mbps shaping resource to 10 Mbps so that the shaping resource may handle the new packet. While a shaping resource of the desired speed is not immediately available, the NPU may control the rate of packet transfer with generic shaping resources or other mechanisms.

Figure 2:
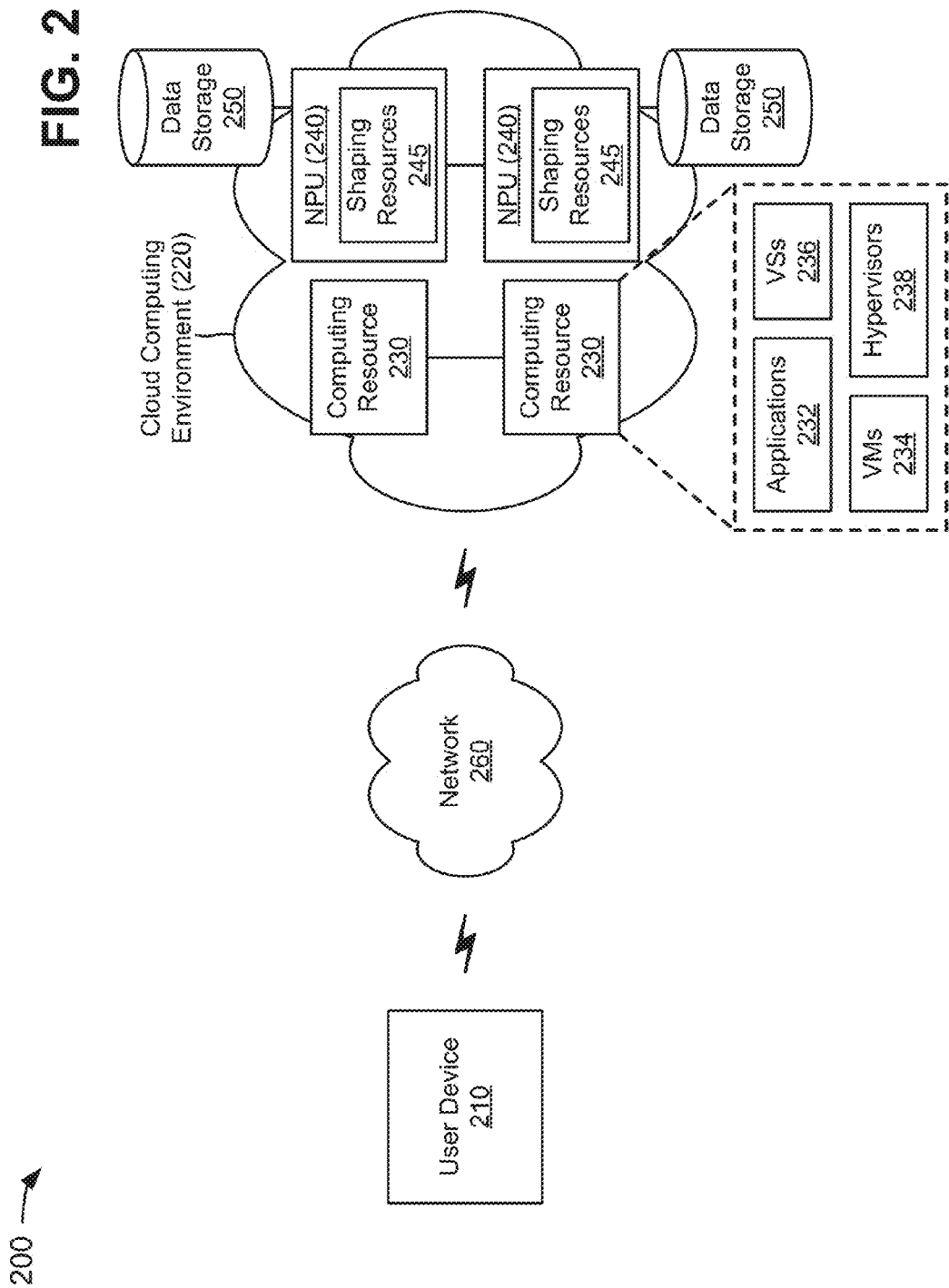
FIG. 2 is a diagram of an example environment in which systems and/or methods described herein may be implemented.

FIG. 2 is a diagram of an example environment 200 in which systems and/or methods described herein may be implemented. As illustrated, environment 200 may include a user device 210 interconnected with a cloud computing environment 220 via a network 260. Devices/networks of environment 200 may interconnect via wired connections, wireless connections, or a combination of wired and wireless connections.

User device 210 may include a device that is capable of communicating over network 260 with cloud computing environment 220 and/or one or more devices of cloud computing environment 220. In some implementations, user device 210 may include a radiotelephone; a personal communications services (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; a desktop computer; a workstation computer; a personal computer; a landline telephone; a gaming device; or another type of computation and communication device.

Cloud computing environment 220 may include an environment that delivers computing as a service, whereby shared resources, services, etc. may be provided to user device 210. Cloud computing environment 220 may provide computation, software, data access, storage, etc. services that do not require end-user (e.g., user device 210) knowledge of a physical location and configuration of system(s) and/or device(s) that deliver the services.

As shown, cloud computing environment 220 may include a group of computing resources 230 (referred to collectively as "computing resources 230" and individually as "computing resource 230"), a group of NPUs 240 (referred to collectively as "NPUs 240" and individually as "NPU 240"), and data storage 250 associated with each NPU 240.

Computing resource 230 may include one or more personal computers, workstation computers, server devices, or other types of computation and communication devices. In some implementations, computing resource 230 may provide cloud resources to user device 210. The cloud resources may include compute instances executing in computing resource 230, storage devices provided in computing resource 230, data transfer operations executed by computing resource 230, etc. In some implementations, computing resource 230 may communicate with other computing resources 230 via wired connections, wireless connections, or a combination of wired and wireless connections.

As further shown in FIG. 2, computing resource 230 may include one or more applications 232, one or more virtual machines (VMs) 234, virtualized storage (VSs) 236, one or more hypervisors 238, etc.

Application 232 may include one or more software applications that may be provided to or accessed by user device 210. Application 232 may eliminate a need to install and execute the software applications on user device 210. For example, application 232 may include word processing software, database software, monitoring software, financial software, communication software, and/or any other software capable of being provided via cloud computing environment 220. In some implementations, one application 232 may send/receive information to/from one or more other applications 232, via virtual machine 234.

Virtual machine 234 may include a software implementation of a physical machine (e.g., a computer) that executes programs like a physical machine. Virtual machine 234 may be either a system virtual machine or a process virtual machine, depending upon use and degree of correspondence to any real machine by virtual machine 234. A system virtual machine may provide a complete system platform that supports execution of a complete operating system (OS). A process virtual machine may execute a single program, and may support a single process. In some implementations, virtual machine 234 may execute on behalf of a user (e.g., user device 210), and may manage infrastructure of cloud computing environment 220, such as data management, synchronization, and long-duration data transfers.

Virtualized storage 236 may include one or more storage systems and/or one or more devices that use virtualization techniques to enable functionality and advanced features within the storage systems or devices of computing resource 230. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system greater flexibility in how storage is managed for end users. File virtualization may eliminate dependencies between data accessed at a file level and a location where files are physically stored. This may enable optimization of storage use, server consolidation, and/or performance of non-disruptive file migrations.

Hypervisor 238 may provide hardware virtualization techniques that allow multiple operating systems (e.g., "guest operating systems") to execute concurrently on a host computer, such as computing resource 230. Hypervisor 238 may present a virtual operating platform to the guest operating systems, and may manage the execution of the guest operating systems. Multiple instances of a variety of operating systems may share virtualized hardware resources. Hypervisor 238 may provide an interface to infrastructure as a service (IaaS) provided by cloud computing environment 220.

NPU 240 may include a traffic transfer device, such as a gateway, a router, a switch, a firewall, a network interface card (NIC), a hub, a bridge, a proxy server, an optical add-drop multiplexer (OADM), or some other type of device that processes and/or transfers traffic (e.g., packets). In some implementations, NPU 240 may include an integrated circuit that processes and transfers packets among computing resources 230. In some implementations, NPU 240 may provide quality of service (QoS) enforcement by identifying different classes of packets and providing preferential treatment for some classes of packets over other classes of packets.

As further shown in FIG. 2, NPU 240 may include one or more shaping resources 245. Shaping resource 245 may include hardware and/or software that provides traffic or packet shaping in order to regulate data transfer (e.g., among computing resources 230) with a particular level of performance, quality of service (QoS), etc. In some implementations, shaping resource 245 may transfer traffic (e.g., packets) at a particular transfer speed or data transfer rate (e.g., in Mbps, Gbps, etc.). In some implementations, when a packet arrives at NPU 240, NPU 240 may associate, to the packet, a particular shaping resource 245 with a transfer speed that matches a transfer speed requested by the packet.

Data storage 250 may include one or more storage devices that store information in one or more data structures, such as databases, tables, lists, trees, etc. In some implementations, data storage 250 may store information, such as identifiers (e.g., numeric identifiers, alphabetical identifiers, alphanumeric identifiers, etc.) of shaping resources 245, information associated with transfer speeds (e.g., data transfer rates) of shaping resources 245, information indicating availabilities of shaping resources 245, etc. In some implementations, data storage 250 may be included within NPU 240.

Network 260 may include a network, such as a local area network (LAN), a wide area network (WAN), a metropolitan area network (MAN), a telephone network, such as the Public Switched Telephone Network (PSTN) or a cellular network, an intranet, the Internet, a fiber optic network, or a combination of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
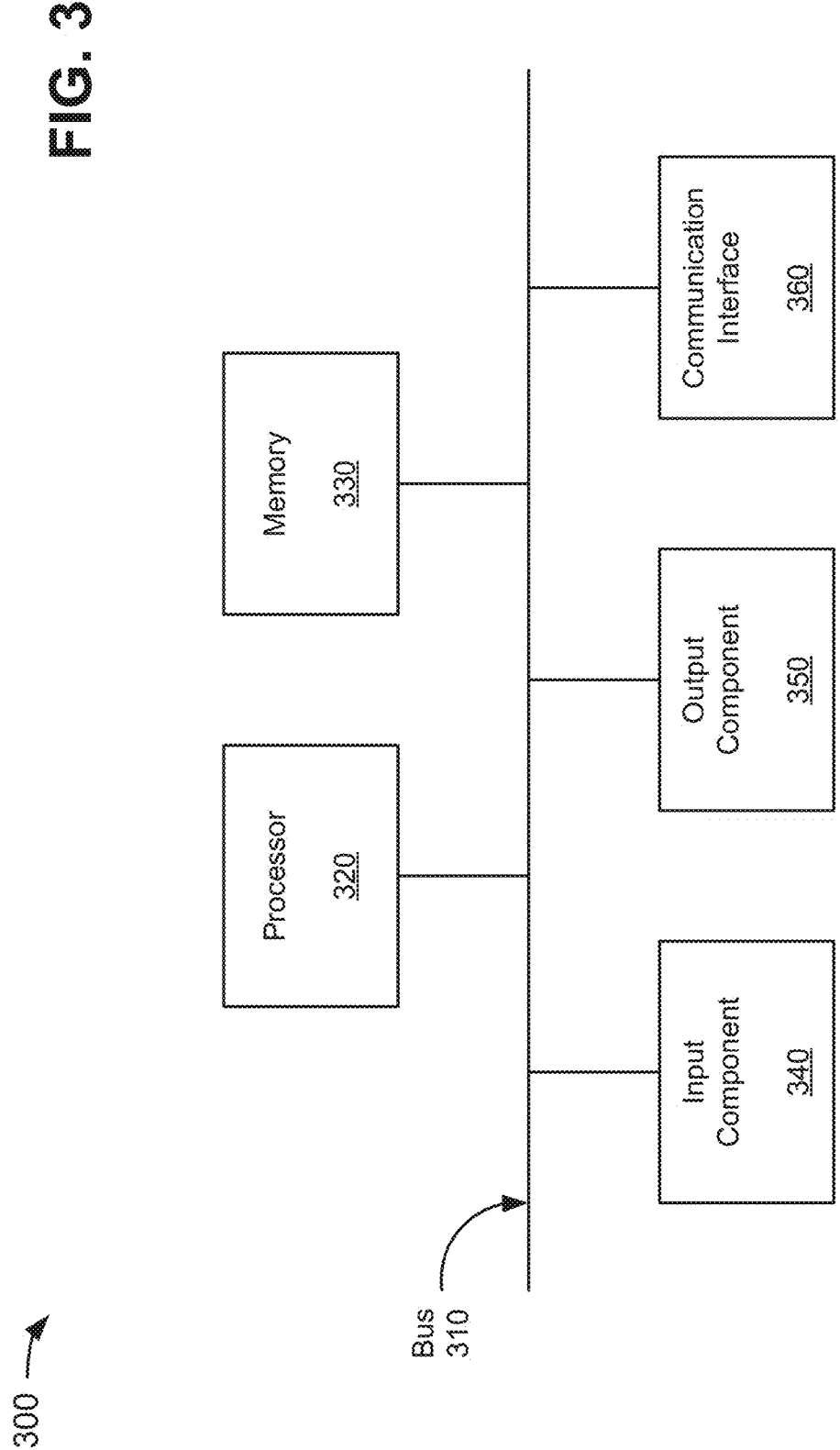
FIG. 3 is a diagram of example components of a device that may correspond to one or more of the devices of the environment depicted in FIG. 2.

FIG. 3 is a diagram of example components of a device 300 that may correspond to one or more of the devices of environment 200. In some implementations, one or more of the devices of environment 200 may include one or more devices 300 or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement a particular function. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, which enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

Figure 4:
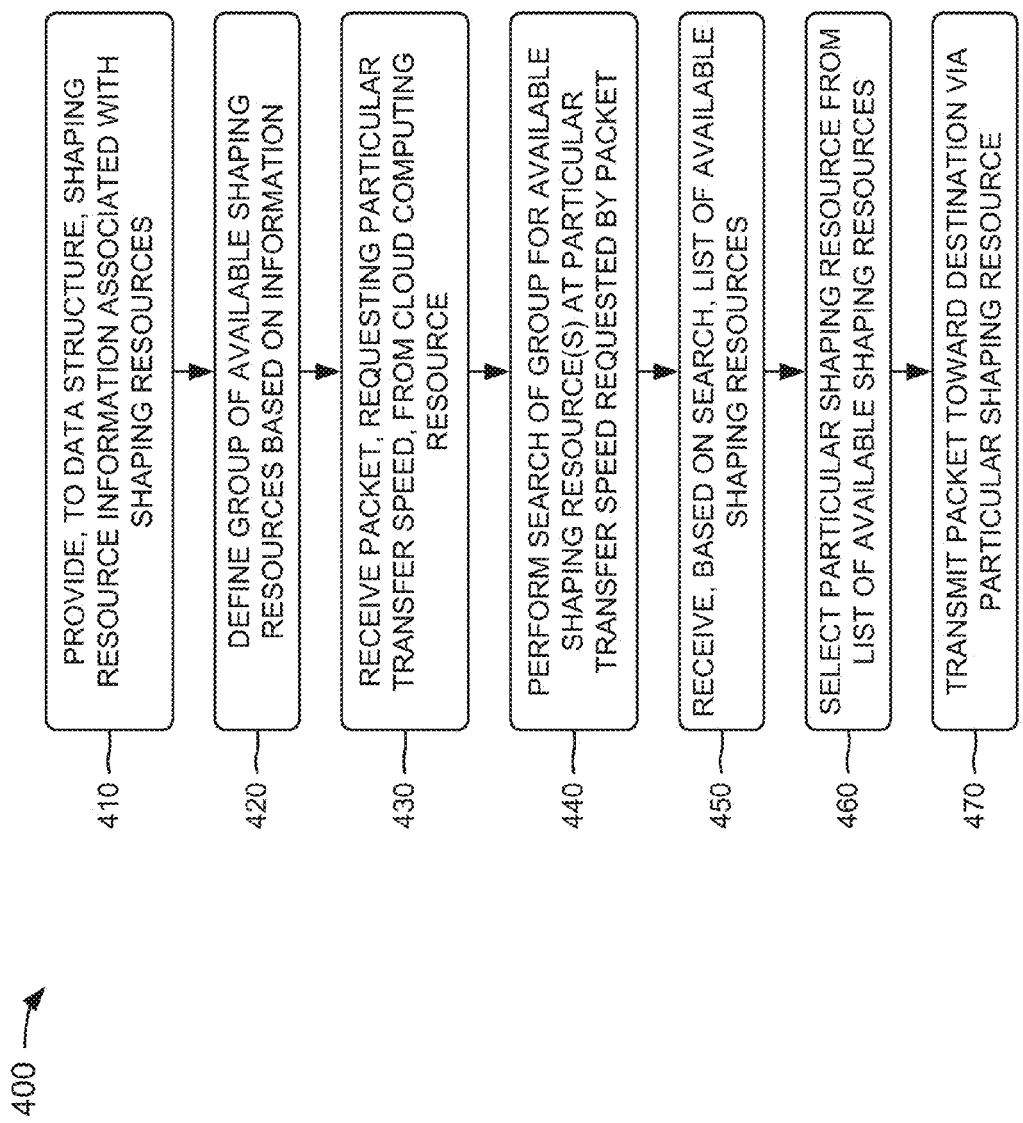
FIG. 4 is a flow chart of an example process for allocating shaping resources for cloud computing resources based on transfer speeds associated with the shaping resources.

FIG. 4 is a flow chart of an example process 400 for allocating shaping resources for cloud computing resources based on transfer speeds associated with the shaping resources. In some implementations, one or more process blocks of FIG. 4 may be performed by NPU 240. In some implementations, one or more process blocks of FIG. 4 may be performed by another device or a group of devices separate from or including NPU 240.

As shown in FIG. 4, process 400 may include providing, to a data structure, shaping resource information associated with shaping resources (block 410). For example, NPU 240 may provide shaping resource information (e.g., associated with shaping resources 245) to a data structure (e.g., a table, a database, a list, etc.) provided in data storage 250. In some implementations, the shaping resource information may include identifiers associate with shaping resources 245, information identifying transfer speeds associated with shaping resources 245, information indicating whether shaping resources 245 are available (e.g., not in use) or unavailable (e.g., in use), etc.

In some implementations, NPU 240 may assign an identifier to each shaping resource 245. For example, NPU 240 may assign a numeric, an alphabetical, or an alphanumeric identifier to each shaping resource 245. In some implementations, NPU 240 may provide the assigned identifiers of shaping resources 245 to the data structure of data storage 250 via the shaping resource information.

In some implementations, NPU 240 may configure each shaping resource 245 with a particular transfer speed. For example, NPU 240 may configure one or more shaping resources 245 with the same transfer speed (e.g., 10 Mbps, 20 Mbps, etc.), one or more shaping resources 245 with different transfer speeds, etc. In some implementations, NPU 240 may configure a first set of shaping resources 245 with a transfer speed of 10 Mbps, a second set of shaping resources 245 with a transfer speed of 20 Mbps, a third set of shaping resources 245 with a transfer speed of 100 Mbps, etc. In some implementations, NPU 240 may monitor transfer speeds requested by received packets, and may configure the transfer speeds of shaping resources 245 based on the monitored transfer speeds and to ensure that the transfer speeds requested by the packets are satisfied. In some implementations, NPU 240 may provide information associated with the configured transfer speeds of shaping resources 245 to the data structure of data storage 250 via the shaping resource information.

In some implementations, one or more shaping resources 245 may be available if the one or more shaping resources 245 are not processing and/or transferring packets (e.g., are not in use). In some implementations, one or more shaping resources 245 may be unavailable if the one or more shaping resources 245 are processing and/or transferring packets (e.g., are in use) In some implementations, NPU 240 may provide information indicating whether shaping resources 245 are available (e.g., not in use) or unavailable (e.g., in use) to the data structure of data storage 250 via the shaping resource information.

In some implementations, data storage 250 may receive the shaping resource information, and may provide the shaping resource information in the data structure. For example, data storage 250 may create, based on the shaping resource information and/or an instruction from NPU 240, a table that includes a shaping resource identifier field, a transfer speed field, an availability field, etc. The shaping resource identifier field may include one or more entries for the assigned identifiers of shaping resources 245. The transfer speed field may include one or more entries for the information associated with the configured transfer speeds of shaping resources 245. The availability field may include one or more entries for the information indicating whether shaping resources 245 are available or unavailable.

As further shown in FIG. 4, process 400 may include defining a group of available shaping resources based on the shaping resource information (block 420). For example, NPU 240 may define a group of available shaping resources 245 based on the shaping resource information. In some implementations, NPU 240 may identify shaping resources 245 that are available based on the information indicating whether shaping resources 245 are available or unavailable provided in the data structure of data storage 250. NPU 240 may define the group of available shaping resources 245 based on the identified shaping resources 245.

In some implementations, NPU 240 may sort the shaping resource information provided in the data structure of data storage 250 based on the information indicating whether shaping resources 245 are available or unavailable. For example, NPU 240 may identify a first portion of entries in the data structure for shaping resources that are available, and may identify a second portion of entries in the data structure for shaping resources that are unavailable. NPU 240 may define the group of available shaping resources 245 based on the first portion of entries in the data structure.

In some implementations, data storage 250 may receive information identifying the group of available shaping resources 245, and may provide the information identifying the group of available shaping resources 245 in another data structure. For example, data storage 250 may create, based on the information identifying the group of available shaping resources 245 and/or an instruction from NPU 240, another table that includes a shaping resource identifier field and a transfer speed field. The shaping resource identifier field may include one or more entries for the assigned identifiers of the available shaping resources 245. The transfer speed field may include one or more entries for the information associated with the configured transfer speeds of the available shaping resources 245.

In some implementations, NPU 240 may cause data storage 250 to sort the entries of the table for the group of available shaping resources 245 based on transfer speeds associated with the available shaping resources 245 provided in the group. In some implementations, NPU 240 may cause data storage 250 to sort the entries in ascending order based on the transfer speeds associated with the available shaping resources 245. For example, assume that a first shaping resource 245 of the group includes a transfer speed of 100 Mbps, a second shaping resource 245 of the group includes a transfer speed of 10 Mbps, and a third shaping resource 245 of the group includes a transfer speed of 20 Mbps. In such an example, NPU 240 may cause data storage 250 to sort the entries so that the entry for the second shaping resource 245 (transfer speed=10 Mbps) is first, the entry for the third shaping resource 245 (transfer speed=20 Mbps) is second, and the entry for the first shaping resource 245 (transfer speed=100 Mbps) is last. In some implementations, NPU 240 may cause data storage 250 to sort the entries in descending order based on the transfer speeds associated with the available shaping resources 245. Using the previous example, NPU 240 may cause data storage 250 to sort the entries so that the entry for the first shaping resource 245 (transfer speed=100 Mbps) is first, the entry for the third shaping resource 245 (transfer speed=20 Mbps) is second, and the entry for the second shaping resource 245 (transfer speed=10 Mbps) is last.

In some implementations, NPU 240 may cause data storage 250 to create a default group of shaping resources 245 to utilize in case no other shaping resources 245 are available for transmitting a packet. For example, NPU 240 may identify, as the default group, particular shaping resources 245 that may not be associated for packet transmission by NPU 240. In some implementations, NPU 240 may keep the particular shaping resources 245 on standby in the event that no other shaping resources 245 are available for transmitting a packet. In some implementations, data storage 245 may create a table that includes information (e.g., shaping resource identifiers, transfer speed information, etc.) associated with the particular shaping resources 245 provided in the default group. In some implementations, if no other shaping resources 245 are available for transmitting a packet, NPU 240 may utilize one of the particular shaping resources 245 provided in the default group to transmit the packet.

As further shown in FIG. 4, process 400 may include receiving a packet, requesting a particular transfer speed, from a cloud computing resource (block 430). For example, NPU 240 may receive a packet, requesting a particular transfer speed, from computing resource 230 (e.g., from virtual machine 234 of computing resource 230). In some implementations, a user associated with user device 10 may utilize virtual machine 234 of computing resource 230 to access software, services, storage, etc. provided by virtual machine 234. User device 210 may provide the packet to virtual machine 234 or may cause virtual machine 234 to generate the packet based on the interactions between user device 210 and virtual machine 234. In some implementations, the packet may be destined for another virtual machine 234 provided on another computing resource 230. In some implementations, the packet may request to be transmitted at a particular transfer speed (e.g., 10 Mbps, 20 Mbps, 30 Mbps, etc.).

As further shown in FIG. 4, process 400 may include performing a search, of the group of available shaping resources, for one or more available shaping resources at the particular transfer speed requested by the packet (block 440). For example, when NPU 240 receives the packet, NPU 240 may perform a search of the group of available shaping resources 245 based on the particular transfer speed requested by the packet. In some implementations, the search may attempt to identify, in the group, one or more available shaping resources 245 that provide at least the particular transfer speed requested by the packet. For example, the search may include information identifying the particular transfer speed and a request to search the group of available shaping resources 245 for shaping resources 245 with transfer speeds that match or exceed the particular transfer speed.

In some implementations, NPU 240 may provide the search to data storage 250, and data storage 250 may receive the search. In some implementations, data storage 250 may perform the search of the group of available shaping resources 245 based on the information identifying the particular transfer speed and the request to search the group. For example, data storage 250 may determine whether any entries in the group of available shaping resources 245 include transfer speeds that match or exceed the particular transfer speed requested by the packet.

As further shown in FIG. 4, process 400 may include receiving, based on the search, a list of available shaping resources (block 450). For example, NPU 240 may receive, from data storage 250 and based on the search, a list of available shaping resources 245 (e.g., which may be referred to as search results). In some implementations, if data storage 250 determines that one or more entries in the group of available shaping resources include transfer speeds that match or exceed the particular transfer speed requested by the packet, data storage 250 may provide information associated with the matching entries in the list of available shaping resources 245. For example, data storage 250 may include, in the list of available shaping resources 245, identifiers of shaping resources 245 that include transfer speeds that match or exceed the particular transfer speed requested by the packet. In one example, assume that the group of available shaping resources 245 includes three shaping resources 245 associated with a transfer speed of 10 Mbps, four shaping resources 245 associated with a transfer speed of 50 Mbps, and two shaping resources 245 associated with a transfer speed of 100 Mbps. Further, assume that the particular transfer speed requested by the packet is 50 Mbps. In such an example, data storage 250 may include, in the list of available shaping resources 245, identifiers of the four shaping resources 245 associated with the transfer speed of 50 Mbps and possibly identifiers of the two shaping resources 245 associated with the transfer speed of 100 Mbps. In some implementations, NPU 240 may utilize one of the shaping resources 245, provided in the list, to transmit the packet toward a destination of the packet (e.g., another computing resource 230).

In some implementations, if none of the transfer speeds associated with shaping resources 245 provided in the group of available shaping resources 245 match the particular transfer speed requested by the packet, data storage 250 may include, in the list of available shaping resources 245, identifiers of shaping resources 245 that include transfer speeds that are closest to the particular transfer speed requested by the packet. For example, assume that the group of available shaping resources 245 includes three shaping resources 245 associated with a transfer speed of 10 Mbps, four shaping resources 245 associated with a transfer speed of 30 Mbps, and two shaping resources associated with a transfer speed of 40 Mbps. Further, assume that the particular transfer speed requested by the packet is 50 Mbps. In such an example, data storage 250 may include, in the list of available shaping resources 245, identifiers of the two shaping resources 245 associated with the transfer speed of 40 Mbps since 40 Mbps is a closest transfer speed to the particular transfer speed of 50 Mbps.

In some implementations, NPU 240 may change transfer speeds of shaping resources 245 to match transfer speeds requested by packets. For example, assume that shaping resources 245 of NPU 240 are configured to 50 Mbps and 60 Mbps, and that all of the 50 Mbps shaping resources 245 are unavailable. Further, assume that a new packet requests a 50 Mbps transfer speed. In such an example, NPU 240 may change the transfer speed of a 60 Mbps shaping resource 245 to 50 Mbps so that shaping resource 245 may handle the new packet at the requested 50 Mbps transfer speed.

As further shown in FIG. 4, process 400 may include selecting a particular shaping resource from the list of available shaping resources (block 460). For example, NPU 240 may select a particular shaping resource 245 from the list of available shaping resources 245 received from data storage 250. In some implementations, NPU 240 may select an identifier of the particular shaping resource 245 from the list of available shaping resources 245. In some implementations, if the list of available shaping resources 245 includes shaping resources 245 with transfer speeds that are closest to the particular transfer speed, NPU 240 may select a particular shaping resource 245 with a transfer speed closest to the particular transfer speed. In such implementations, NPU 240 may reconfigure or change the transfer speed of the particular shaping resource 245 to match the particular transfer speed requested by the packet. In some implementations, if multiple shaping resources 245 provided in the list have matching transfer speeds, then NPU 240 may select a particular shaping resource 245 from the list (e.g., randomly, based on identifiers of the multiple shaping resources 245, etc.). Once the particular shaping resource 245 has been selected for the packet, the particular shaping resource 245 may be reserved for the exclusive use of transmitting particular data (e.g., a sequence of packets to the same destination VM).

As further shown in FIG. 4, process 400 may include transmitting the packet toward a destination via the particular shaping resource (block 470). For example, NPU 240 may utilize the particular shaping resource 245 to transmit the packet toward a destination of the packet (e.g., another computing resource 230). In some implementations, the particular shaping resource 245 may transmit the packet directly to the other computing resource 230. In some implementations, the particular shaping resource 245 may transmit the packet to one or more other devices of cloud computing environment 220, and the one or more other devices may forward the packet to the other computing resource 230.

In some implementations, NPU 240 may maintain an indication of a last time when an unavailable shaping resource 245 is used for transmission. NPU 240 may periodically update a list of unavailable shaping resources 245 (e.g., based on the last time used or some other criteria), and may return idle unavailable shaping resources 245 to an available state and reflect the change in the data structure of data storage 250 (e.g., make shaping resources 245 available again). In some implementations, NPU 240 may utilize timestamps (e.g., an idle timeout value) to periodically update the list of unavailable shaping resources 245.

In some implementations, NPU 240 may periodically monitor the availability of available shaping resources 245 in order to increase the likelihood that the available shaping resources 245 are available for any supported transmission speed. NPU 240 may query the data structure of data storage 250 for the available shaping resources 245 for each of the transmission speeds that need to be supported. NPU 240 may decide to reconfigure the transmission speeds of the available shaping resources 245 based on a comparison the number of available shaping resources 245 at a particular speed and a threshold level for a new speed, based on an available buffer count at the particular speed, etc. When NPU 240 reconfigures the available shaping resources 245, NPU 240 may designate the available shaping resources 245 as ineligible for the query, and may change QoS properties (e.g., transmission speed) of the available shaping resources 245. NPU 240 may reflect the new QoS properties in data storage 250, and may designate the available shaping resources 245 as eligible for the query again.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
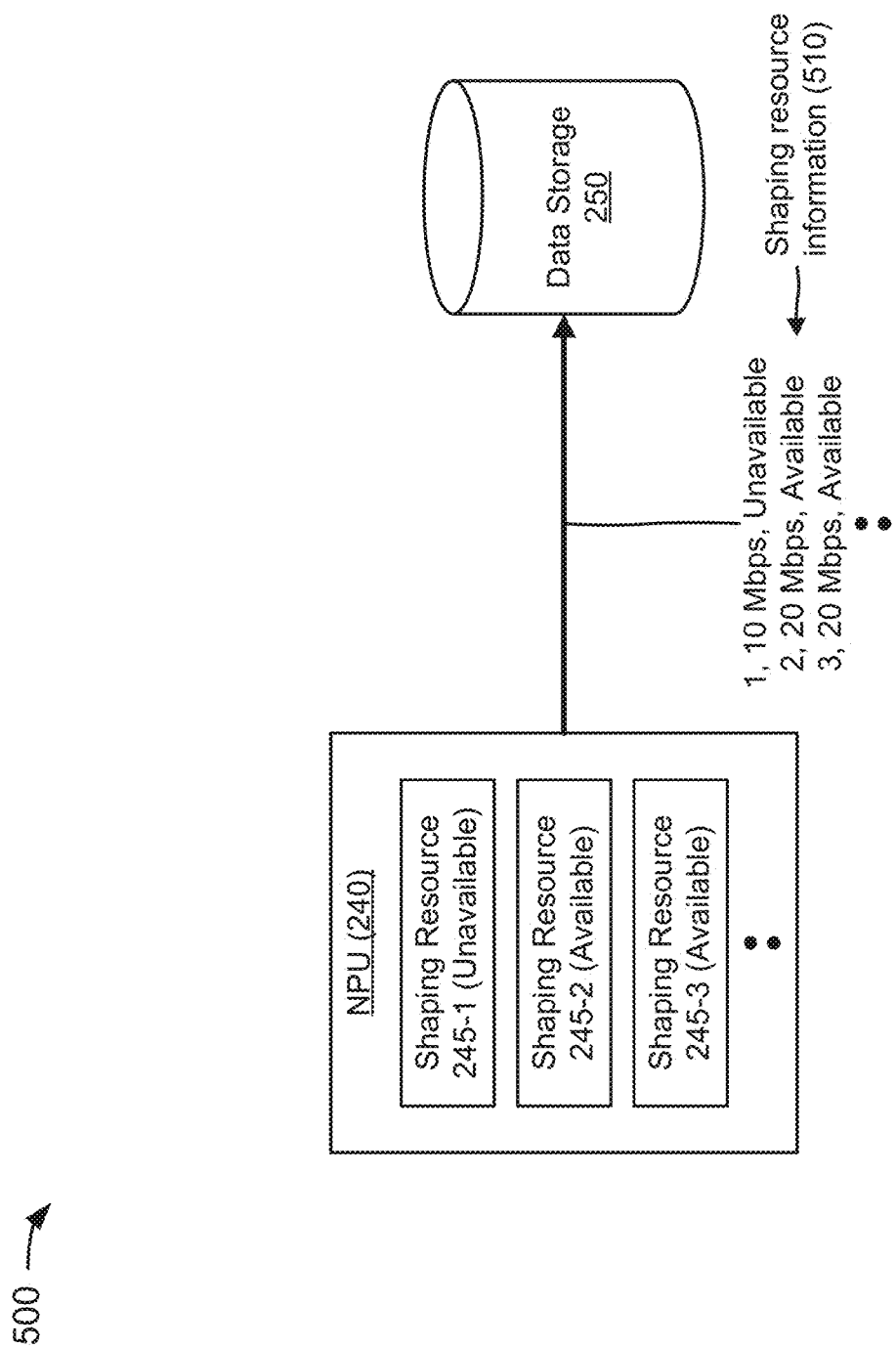

FIGS. 5A-5E are diagrams of an example 500 relating to example process 400 shown in FIG. 4. In example 500, assume that NPU 240 includes multiple shaping resources 245-1, . . . 245-N (collectively referred to as shaping resources 245, where N>1), and that some of shaping resources 245 are unavailable (e.g., in use) and some of shaping resources 245 are available (e.g., not in use). As shown in FIG. 5A, NPU 240 may provide shaping resource information 510, associated with shaping resources 245, to data storage 250. Shaping resource information 510 may include, for example, an identifier (1), a transfer speed (10 Mbps), and availability information (Unavailable) associated with shaping resource 245-1; an identifier (2), a transfer speed (20 Mbps), and availability information (Available) associated with shaping resource 245-2; an identifier (3), a transfer speed (20 Mbps), and availability information (Available) associated with shaping resource 245-3; etc.

Data storage 250 may receive shaping resource information 510, and may provide shaping resource information 510 in a data structure based on an instruction from NPU 240. For example, as shown in FIG. 5B, data storage 250 may create a table 520 that includes a shaping resource identifier (ID) field, a transfer speed field, and an availability field, and may populate table 520 with shaping resource information 510. The shaping resource identifier field may include one or more entries for the identifiers (e.g., 1, 2, 3, etc.) of shaping resources 245. The transfer speed field may include one or more entries for the information associated with the transfer speeds (e.g., 10 Mbps, 20 Mbps, etc.) of shaping resources 245. The availability field may include one or more entries for information indicating whether shaping resources 245 are available (e.g., Yes) or unavailable (e.g., No).

As further shown in FIG. 5B, NPU 240 may identify a group 530 of available shaping resources 245 based on the information contained in table 520. For example, NPU 240 may include, in group 530, information associated with shaping resources 245 that are available (e.g., as indicated by "Yes" in table 520). NPU 240 may cause data storage 250 to create another table for group 530 of available shaping resources 245, as shown in FIG. 5B. For example, data storage 250 may create, based on group 530 of available shaping resources 245 and/or an instruction from NPU 240, a table that includes a shaping resource identifier field and a transfer speed field. The shaping resource identifier field may include one or more entries for the identifiers (e.g., 5, 15, etc.) of the available shaping resources 245. The transfer speed field may include one or more entries for the information associated with the transfer speeds (e.g., 5 Mbps, 20 Mbps, etc.) of the available shaping resources 245. Further, assume that NPU 240 causes data storage 250 to sort group 530 of available shaping resources 245 in ascending order based on the transfer speeds of the available shaping resources 245.

In example 500, further assume that a user associated with user device 210 utilizes virtual machine 234 of computing resource 230 to access software, services, storage, etc. provided by virtual machine 234. Further, assume that user device 210 causes virtual machine 234 to generate a packet 540 based on the interactions between user device 210 and virtual machine 234, as shown in FIG. 5C. Packet 540 may include a request for a service from another computing resource 230 and may be destined for another virtual machine 234 provided on the other computing resource 230. As further shown in FIG. 5C, packet 540 may request to be transmitted at a particular transfer speed of 30 Mbps, and may be provided from computing resource 230 to NPU 240.

Figure 5D:
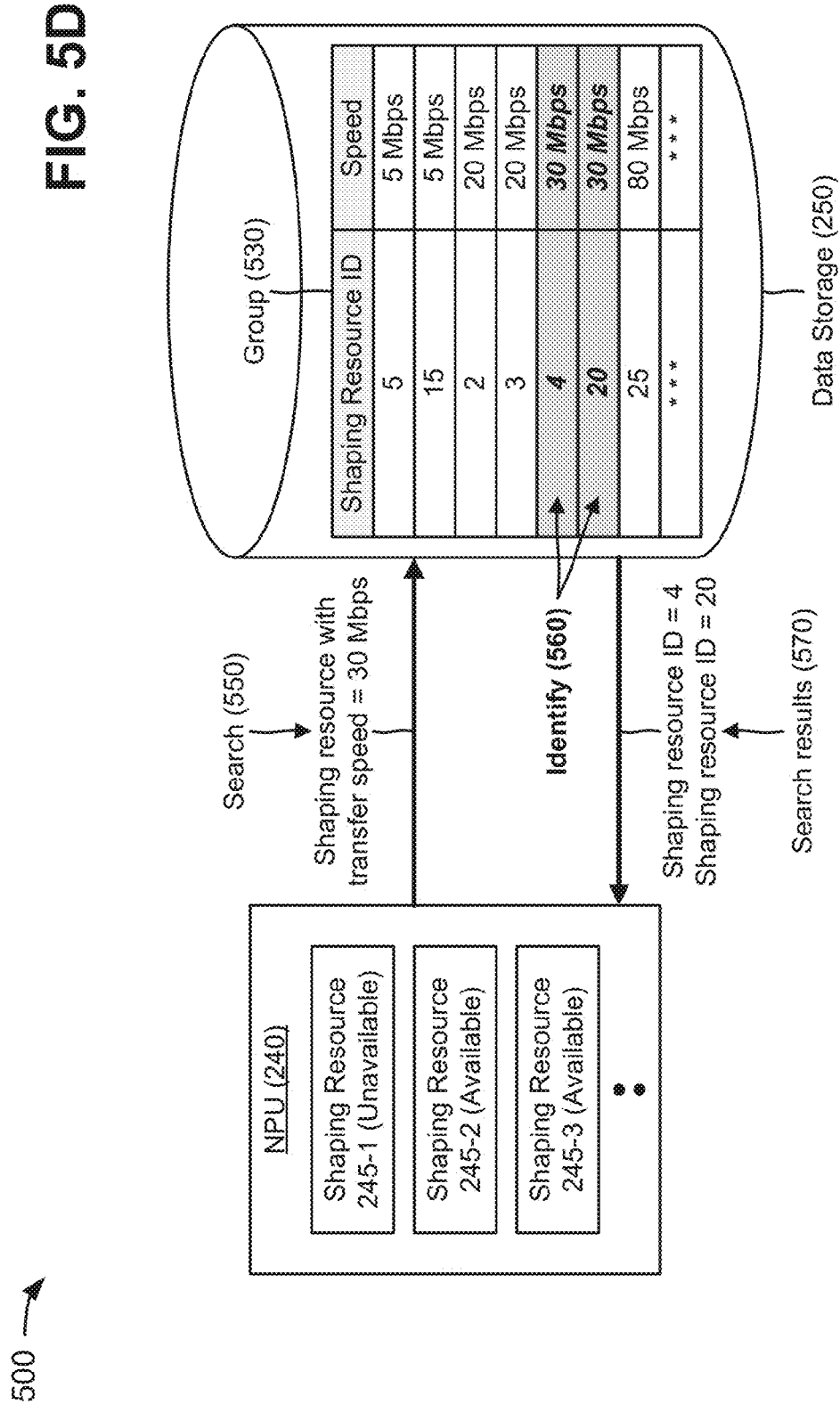
Figure 5E:
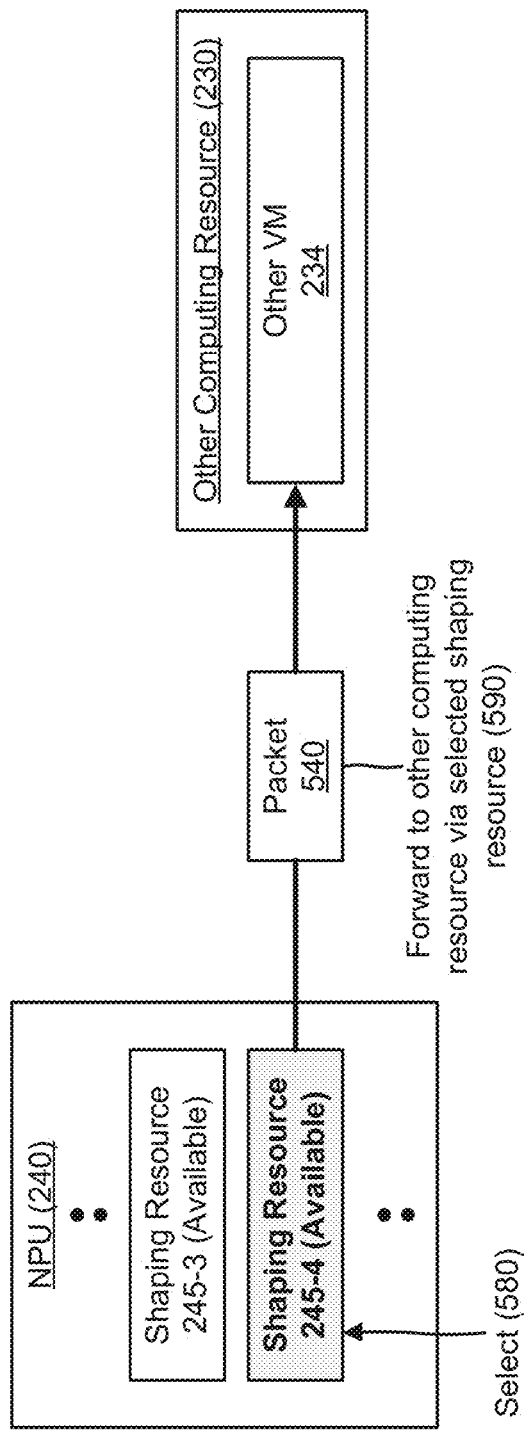

NPU 240 may receive packet 540, and may generate a search request 550 based on information provided in packet 540, as shown in FIG. 5D. Search request 550 may include a request to identify, in group 530 of available shaping resources 530, a shaping resource with a transfer speed of 30 Mbps. As further shown in FIG. 5D, NPU 240 may provide search request 550 to data storage 250, and data storage 250 may perform a search of group 530 based on search request 550. Data storage 250 may identify shaping resources 245-4 and 245-20 (e.g., with shaping resource IDs 4 and 20) in group 530 based on search request 550 since shaping resources 245-4 and 245-20 are configured at a transfer speed of 30 Mbps, as indicated by reference number 560 in FIG. 5D. Data storage 250 may provide search results 570 to NPU 240 based on search request 550, and NPU 240 may receive search results 570. As further shown in FIG. 5D, search results 570 may include the shaping resource IDs 4 and 20 associated with shaping resources 245-4 and 245-20.

NPU 240 may select one of shaping resources 245-4 and 245-20, identified in search results 570, for transmitting packet 540 to the other virtual machine 234 of the other computing resource 230. For example, assume that NPU 240 selects shaping resource 245-4 for transmitting packet 540, as indicated by reference number 580 in FIG. 5E. NPU 240 may forward packet 540 to the other virtual machine 234 of the other computing resource 230 via shaping resource 245-4, as indicated by reference number 590 in FIG. 5E. The other virtual machine 234 may receive packet 540, and may process packet 540 accordingly (e.g., may provide the service requested by packet 540).

As indicated above, FIGS. 5A-5E are provided merely as an example. Other examples are possible and may differ from what was described with regard to FIGS. 5A-5E. In some implementations, the various operations described in connection with FIGS. 5A-5E may be performed automatically or at the request of the user.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the term "having" is intended to be an open-ended term. Further, the phrase "based on" is intended to mean "based, at least in part, on" unless explicitly stated otherwise.

What is claimed is:

1. A method, comprising:
    storing, by a device, shaping resource information in a data structure,
        the shaping resource information including:
            identifiers associated with shaping resources of the device,
            information indicating whether the shaping resources of the device are available, and
            information indicating transfer speeds associated with the shaping resources of the device,
                the shaping resources of the device including hardware resources that provide packet shaping in order to regulate data transfer in accordance with a particular level of performance;
    defining, by the device, a group of available shaping resources based on the shaping resource information stored in the data structure;
    receiving, by the device, a packet requesting a particular transfer speed associated with transmitting the packet, the packet being received from a computing resource provided in a cloud computing environment;
    performing, by the device, a search of the group of available shaping resources based on the particular transfer speed requested by the packet;
    identifying, by the device and based on the search, a list of one or more available shaping resources with transfer speeds that match the particular transfer speed requested by the packet when one or more of the available shaping resources include transfer speeds that match the particular transfer speed;
    transmitting, by the device, the packet toward a destination via one of the one or more available shaping resources provided in the list;
    identifying, by the device and based on the search, another list of one or more available shaping resources with transfer speeds that most closely match the particular transfer speed requested by the packet when none of the available shaping resources include transfer speeds that match the particular transfer speed;
    selecting, by the device, a particular shaping resource from the other list of one or more available shaping resources;
    changing, by the device, a transfer speed of the particular shaping resource to match the particular transfer speed requested by packet; and
    transmitting, by the device, the packet toward the destination via the particular shaping resource and at the particular transfer speed requested by the packet.

2. The method of claim 1, further comprising: selecting another particular shaping resource from the list of one or more available shaping resources, and where transmitting the packet toward the other destination comprises: transmitting the packet toward the destination via the particular shaping resource and at the particular transfer speed requested by the packet.

3. The method of claim 1, further comprising: identifying the shaping resources of the device that are available based on the information indicating whether the shaping resources of the device are available; and associating the identified shaping resources of the device with the group of available shaping resources.

4. The method of claim 3, further comprising: sorting the group of available shaping resources based on transfer speeds associated with the identified shaping resources.

5. The method of claim 1, further comprising: defining a default group of available shaping resources based on the shaping resource information stored in the data structure; and utilizing a shaping resource associated with the default group to transmit another packet when no other shaping resources of the device are available to transmit other packet.

6. The method of claim 1, where the data structure includes:
    a first set entries to store the identifiers associated with the shaping resources of the device,
    a second set of entries to store the information indicating whether the shaping resources of the device are available, and
    a third set of entries to store the information indicating transfer speeds associated with the shaping resources of the device.

7. The method of claim 1, where the computing resource, provided in the cloud computing environment, includes a virtual machine.

8. A device, comprising:
    one or more processors to:
        store shaping resource information in a data structure,
            the shaping resource information including:

identifiers associated with shaping resources of the device, information indicating whether the shaping resources of the device are available, and information indicating transfer speeds associated with the shaping resources of the device,
the shaping resources of the device including hardware resources that provide packet shaping in order to regulate data transfer in accordance with a particular level of performance;

determine a group of available shaping resources based on the shaping resource information stored in the data structure, store information identifying the group of available shaping resources in another data structure, receive a packet requesting a particular transfer speed associated with transmitting the packet,
the packet being received from a computing resource provided in a cloud computing environment, perform a search of the group of available shaping resources based on the particular transfer speed requested by the packet, determine, based on the search, a list of one or more available shaping resources with transfer speeds that match the particular transfer speed requested by the packet when one or more of the available shaping resources include transfer speeds that match the particular transfer speed, transmit the packet toward a destination via one of the one or more available shaping resources provided in the list, identify, based on the search, another list of one or more available shaping resources with transfer speeds that most closely match the particular transfer speed requested by the packet when none of the available shaping resources include transfer speeds that match the particular transfer speed, select a particular shaping resource from the other list of one or more available shaping resources, change a transfer speed of the particular shaping resource to match the particular transfer speed requested by packet, and transmit, the packet toward the destination via the particular shaping resource and at the particular transfer speed requested by the packet.

9. The device of claim 8, where the one or more processors are further to: select another particular shaping resource from the list of one or more available shaping resources, and when transmitting the packet toward the destination, the one or more processors are to: transmit the packet toward the destination via the other particular shaping resource and at the particular transfer speed requested by the packet.

10. The device of claim 8, where, the one or more processors are further to: identify the shaping resources of the device that are available based on the information indicating whether the shaping resources of the device are available, associate the identified shaping resources of the device with the group of available shaping resources, and sort the group of available shaping resources based on transfer speeds associated with the identified shaping resources of the device.

11. The device of claim 8, where the data structure includes: a first set entries to store the identifiers associated with the shaping resources of the device, a second set of entries to store the information indicating whether the shaping resources of the device are available, and a third set of entries to store the information indicating transfer speeds associated with the shaping resources of the device.

12. The device of claim 8, where the one or more processors are further to: define a default group of available shaping resources based on the shaping resource information stored in the data structure, and utilize a shaping resource associated with the default group to transmit another packet when no other draping resources of the device are available to transmit the other packet.

13. The device of claim 8, where the computing resource, provided in the cloud computing environment, includes a virtual machine.

14. The device of claim 8, where the device includes a network processing unit.

15. A non-transitory computer-readable medium for storing instructions, the instructions comprising:
one or more instructions that, when executed by one or more processors of a device, cause the one or more processors to:
store shaping resource information in a data structure, the shaping resource information including:
identifiers associated with shaping resources of the device, information indicating whether the shaping resources of the device are available, and information indicating transfer speeds associated with the shaping resources of the device,
the shaping resources of the device including hardware resources that provide packet shaping in order to regulate data transfer in accordance with a particular level of performance;

define a group of available shaping resources based on the shaping resource information stored in the data structure, receive a packet requesting a particular transfer speed associated with transmitting the packet,
the packet being received from a computing resource provided in a cloud computing environment, perform a search of the group of available shaping resources based on the particular transfer speed requested by the packet, identify, based on the search, a list of one or more available shaping resources based on the particular transfer speed requested by the packet when one or more of the available shaping resources include transfer speeds that match the particular transfer speed, transmit the packet toward a destination via one of the one or more available shaping resources provided in the list, identify, based on the search, another list of one or more available shaping resources with transfer speeds that most closely match the particular transfer speed requested by the packet when none of the available shaping resources include transfer speeds that match the particular transfer speed, select a particular shaping resource from the other list of one or more available shaping resources, change a transfer speed of the particular shaping resource to match the particular transfer speed requested by packet, and transmit the packet toward the destination via the particular shaping resource and at the particular transfer speed requested by the packet.

16. The non-transitory computer-readable medium of claim 15, where the instructions further comprise: one or more instructions that, when executed by the one or more processors, cause the one or more processors to: select another particular shaping resource from the list of one or more available shaping resources, the other particular shaping resource corresponding to the one of the one or more available shaping resources provided in the list.

17. The non-transitory computer-readable medium of claim 15, where the instructions further comprise: one or more instructions that, when executed by the one or more processors, cause the one or more processors to: identify the shaping resources of the device that are available based on the information indicating whether the shaping resources are available, associate the identified shaping resources of the device with the group of available shaping resources, and sort the group of available shaping resources based on transfer speeds associated with the identified shaping resources of the device.

18. The non-transitory computer-readable medium of claim 15, where the instructions further comprise:
one or more instructions that, when executed by the one or more processors, cause the one or more processors to:
define a default group of available shaping resources based on the shaping resource information stored in the data structure, and
utilize a shaping resource associated with the default group to transmit another packet when no other shaping resources of the device are available to transmit the other packet.

19. The non-transitory computer-readable medium of claim 15, where the data structure includes:
a first set entries to store the identifiers associated with the shaping resources of the device,
a second set of entries to store the information indicating whether the shaping resources of the device are available, and
a third set of entries to store the information indicating transfer speeds associated with the shaping resources of the device.

20. The non-transitory computer-readable medium of claim 15, where the computing resource, provided in the cloud computing environment, includes a virtual machine.

* * * * *